Sept. 17, 1957 W. L. GASKELL 2,806,493
WORK GUIDE FENCE
Filed Feb. 5, 1954 3 Sheets-Sheet 3
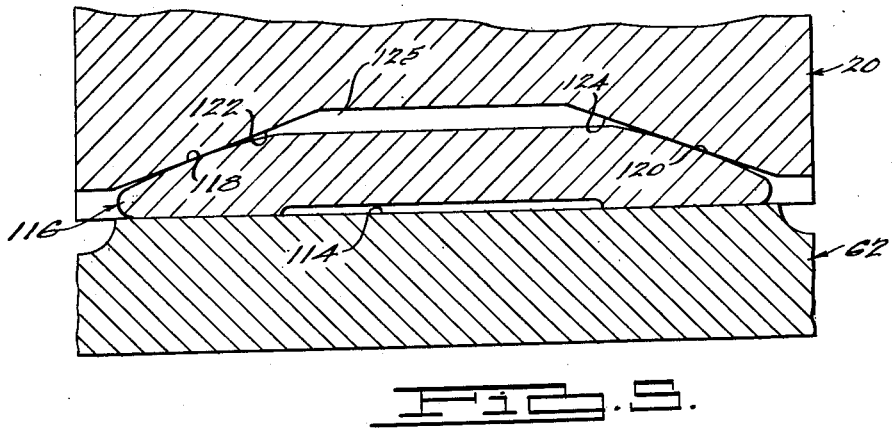
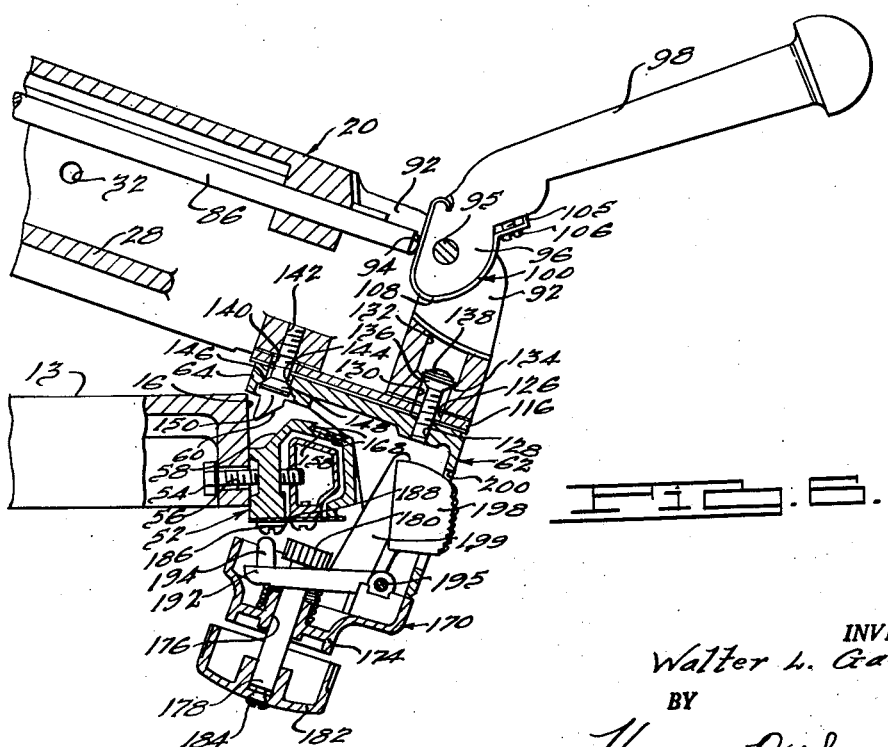
INVENTOR.
Walter L. Gaskell
BY
Harness, Dickey & Pierce
ATTORNEYS.

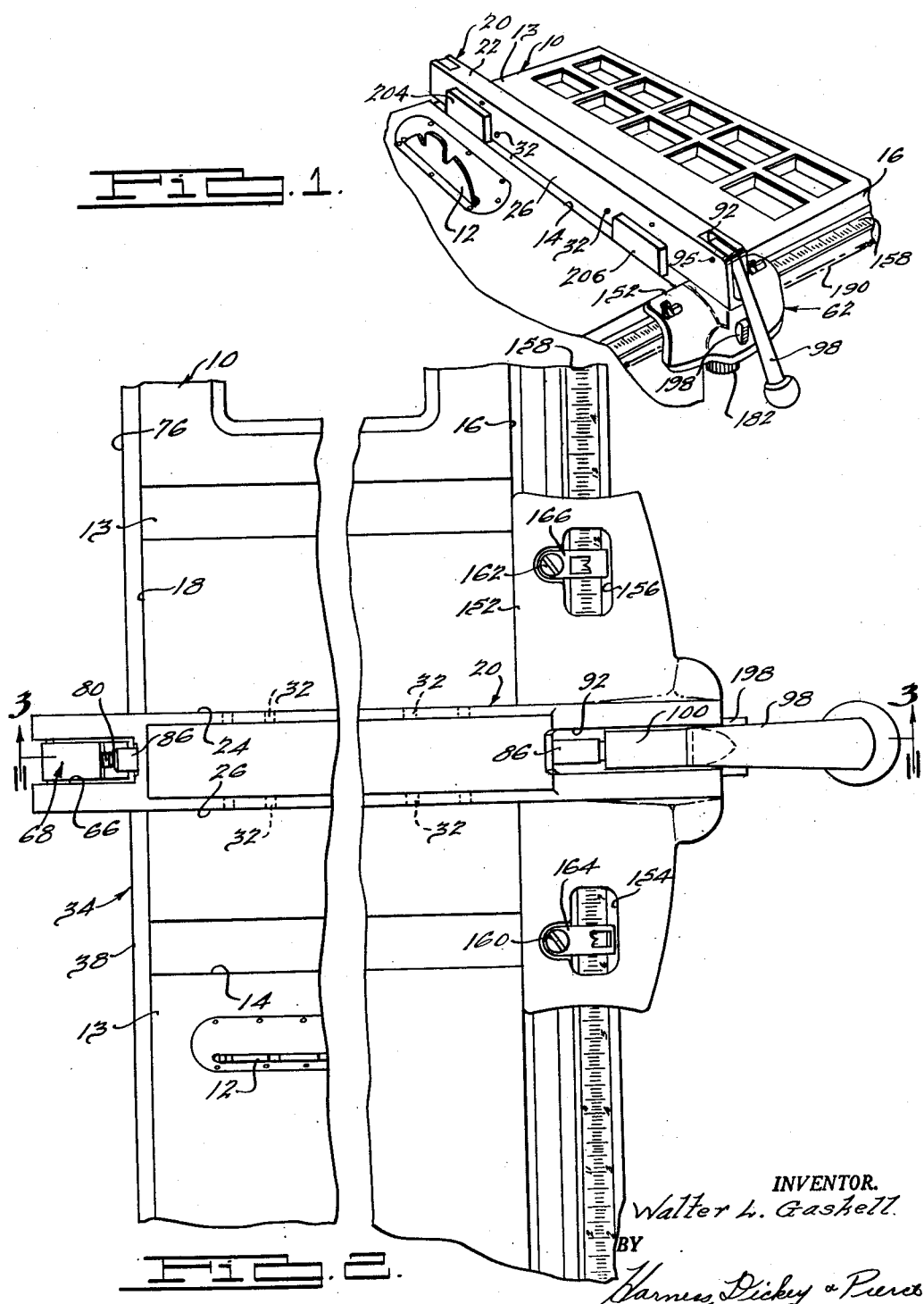

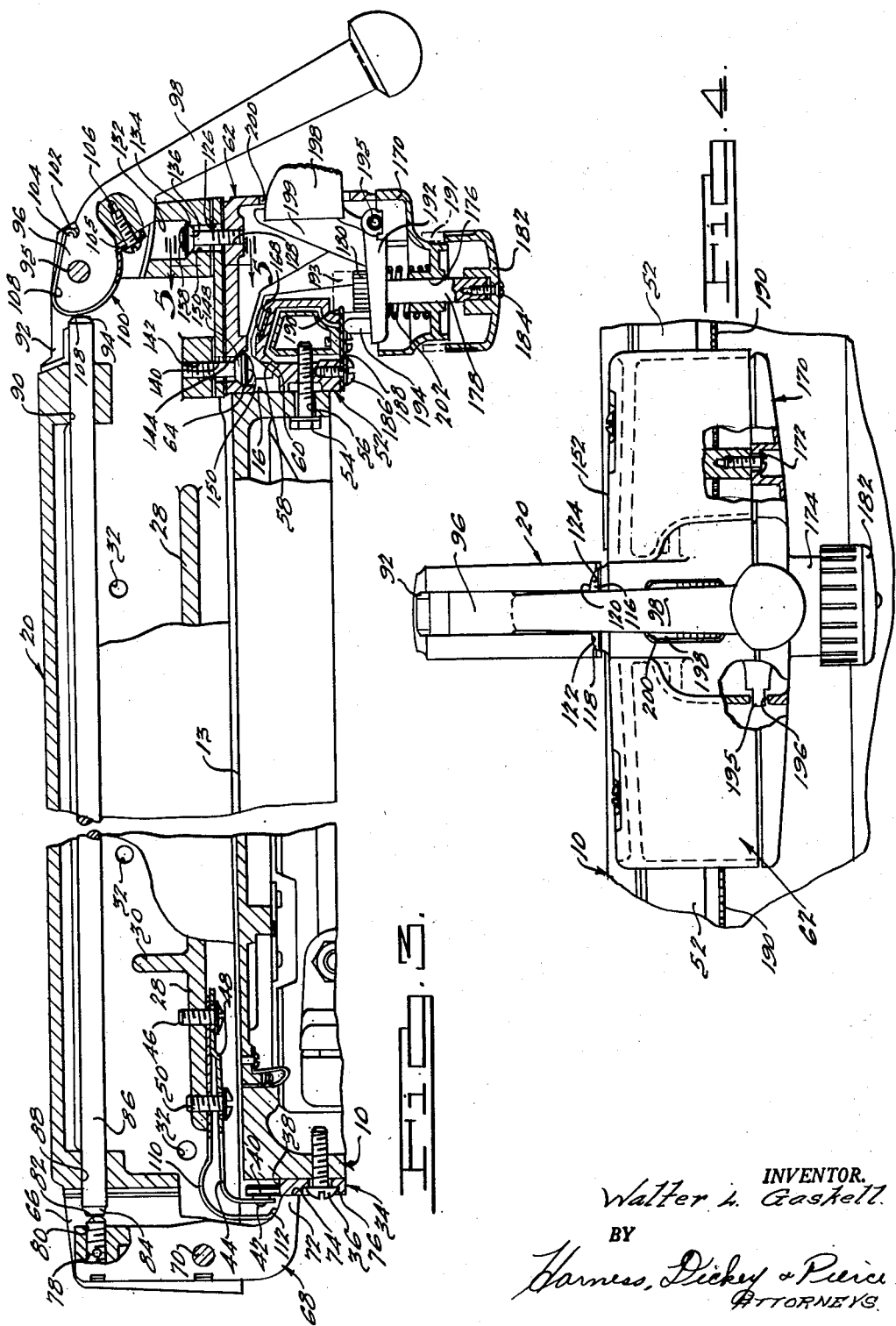

United States Patent Office 2,806,493
Patented Sept. 17, 1957

2,806,493

WORK GUIDE FENCE

Walter L. Gaskell, Ypsilanti, Mich., assignor to King-Seeley Corporation, Ann Arbor, Mich., a corporation of Michigan Application February 5, 1954, Serial No. 408,416

21 Claims. (Cl. 143—176)

This invention relates to improvements in work guide fences adapted for use with various wood-working machine tools such as jointers, arbor saws, band saws, and the like.

The primary object of the invention is to provide an improved work guide fence which may be quickly and accurately secured in any desired position on the work table of a machine tool, and which is relatively inexpensive to manufacture, simple and compact in construction, and suitable for use on machine tools adapted for either commercial or home workshop operations.

The improved work guide fence of the present invention comprises an elongated fence bar or body which is preferably made of cast metal construction having a closed up, and closed vertical sides which are finished to a high degree of accuracy and smoothness. The rear end of the fence body is rollably supported on a rear fence slide bar by means of a roller which is adjustably secured to the rear end of the fence body. The rear bar is suitably secured to the work table of the machine tool on which the work guide fence is to be used. The front end of the fence body is supported by the front fence end or slide, which is slidably mounted on a hollow front fence slide bar, which is preferably extruded from any suitable material and adjustably secured to the front of the work table of the machine tool on which the work guide fence is to be used. The rear supporting roller and the adjustable front face slide bar are adapted to raise the fence bar any desired clearance distance off the work table top to permit easy sliding of the work guide fence. Intermediate the front end of the fence body and the front fence end is a spherical surfaced fence shoe, which is locked in position by means of two spherical washers and bolts, and which permits the fence body to be adjusted horizontally and vertically relative to the front fence end. The work guide fence is provided with means for clamping it to the work table which includes a die cast lock cam, protected by a hardened spring steel face, which functions as a wear plate and a cover for the cam. The front fence slide bar is provided with an extruded groove adapted to slidably receive a flat tape-type scale. The scale has a double set of upper and lower graduations, the upper set of which reads with the fence when it is positioned to the left of the cutting tool, and the lower set of which reads with the fence when it is positioned to the right of the cutting tool. The front fence end is provided with pointers so designed that only the correct set can be read whenever the fence is positioned on the right or the left of the cutting tool. The front fence end is held firmly in position against the front of the table and in contact with the surface of the fence slide bars by means of a tensioner button which is spring loaded and rides the under section of a fence rack secured to the lower side of the front fence slide bar. The tensioner button is provided with a release finger which may be quickly and easily actuated whereby the work guide fence may be quickly removed from the work table. A vernier knob is slidably mounted in the front fence end which when forced upwardly by hand pressure causes a pinion to engage the fence rack on the lower side of the front fence slide bar, so that when the vernier knob is turned a micro-adjustment of the work guide fence is accomplished. When the pressure on the vernier knob is relieved the pinion is automatically disengaged and the vernier knob and pinion return to their initial position by means of gravity.

Objects and features of the invention are shown in the accompanying drawings which illustrate a preferred embodiment of the invention and wherein:

Figure 1 is a fragmentary perspective view of a machine tool provided with a work guide fence made in accordance with the principles of the invention;

Fig. 2 is an enlarged broken plan view of the structure illustrated in Fig. 1;

Fig. 3 is an elevational sectional view of the structure illustrated in Fig. 2, taken on the line 3—3 thereof;

Fig. 4 is an elevational view of the actuating end of the illustrative work guide fence as taken from the right-hand side of Fig. 3;

Fig. 5 is a sectional view of the structure illustrated in Fig. 3, taken on the line 5—5 thereof; and Fig. 6 is a fragmentary view, partially in section, showing the manner in which the work guide fence is disengaged from the front fence slide bar.

Referring now to the drawings and, in particular, to Figs. 1 through 3, the numeral 10 indicates a wood working machine work table in which is operatively mounted a circular saw blade 12. The work table 10 is provided with a horizontal surface 13 having conventional transverse miter slots formed in the upper surface thereof, as indicated at 14, and which are parallel to the cutting action of the saw blade 12. The table 10 has a vertical front edge 16 and a vertical read edge 18.

The illustrative embodiment of the work guide fence of the present invention includes an elongated fence bar 20 which is preferably made of cast metal construction having a closed top 22 and closed vertical sides 24 and 26 which are joined by transverse horizontal ribs as 28 and vertical ribs as 30. The fence bar sides 24 and 26 are both finished to a high degree of accuracy and smoothness by any suitable metal finishing operation and are further provided with holes therethrough, as 32, adapted to permit any tool attachments to be fastened to the fence bar or body 20, as desired. Mounted on the rear vertical face 18 of the work table 10 is an elongated rear fence slide bar 34 which is securely fixed thereto by any suitable means, as by the screws 36 passing through oversized holes in the bar to permit shifting adjustment thereof in vertical and horizontal directions. The rear fence slide bar 34 is provided with an upper horizontal surface 38 which is parallel with the surface 13 of the work table 10. The rear end of the fence bar 20 is rollably supported on the rear fence slide bar upper surface 38 by means of the roller 40. As is best seen in Fig. 3, roller 40 is rotatably mounted as at 42, on the outer end of the lift spring 44. The inner end of the lift spring may be attached to the underside of the rear end of the fence bar 20 by any suitable means, as by the screw 46. The rear end of the lift spring 44 is vertically offset from the forward end thereof as at 48 to permit the rear end of said spring and the attached roller 40 to be adjusted in the vertical plane, as by means of the screw 50, to raise the rear end of the fence bar 20 to any desired clearance distance off the work table 10, to permit easy sliding of the fence bar over said table.

As is best seen in Figs. 3 and 6, a hollow elongated front fence slide bar 52 is adjustably secured to the front vertical work table edge 16, as by means of the screws 54 which are threadably mounted in the fence bar and adapted to pass through the oversized holes 56 in the work table 10. The front fence slide bar 52 is provided with an inwardly inclined longitudinal way 58 which slidably supports the inwardly inclined surface 60 of the front fence end member or slide 62. See my U. S. Patent No. 2,677,400. The front fence slide 62 supports the front end of the fence bar 20 and is described more in detail hereinafter. As is best seen in Fig. 3, the front fence slide 62 is provided with a longitudinal vertical face 64 which abuts the front vertical work table face 16. It will be seen that the front end of the fence bar may be vertically adjusted by means of the adjustable front fence slide bar so as to raise the front end of the fence bar and provided a desired clearance distance off the top surface 13 of the work table 10.

Attention is now directed to the clamping means by which the fence bar 20 may be quickly and accurately secured to the work table 10. As is best seen in Figs. 2, 3, and 6, the rear end of the fence bar 20 is provided with a vertical slot 66 therethrough in which is pivotally mounted a fence lock arm 68, by any suitable means, as by the transverse pin 70. The lower end of the fence lock arm 68 is provided with an inwardly extending finger 72 having a substantially vertical flat face 74 adapted to abut the outer face 76 of the rear fence slide bar 34. The upper end of the fence lock arm 68 is provided with an aperture 78 in which is threadably mounted an adjustable self-locking set screw 80. The forward end of the adjustable self-locking set screw 80 is provided with a rounded hardened nose 82 adapted to engage the rear end 84 of a longitudinal rod 86. The longitudinal rod 86 is slidably mounted in the apertures 88 and 90 which are located in the rear and front upper portions, respectively, of the fence bar 20. The front end of the fence bar 20 is provided with a vertically disposed slot 92 which extends downwardly substantially half way from the upper surface of the fence bar and into which the forward end 94 of the longitudinal rod 86 extends. Pivotally mounted in the slot 92, by any suitable means, as by the pin 95, is a fence lock cam 96 which is preferably die cast from a suitable material and which is formed integral with an operating handle 98. The fence lock cam 96 is provided with a hardened spring steel face 100 which functions as a wear plate and abuts the forward end 94 of the longitudinal rod 86. The hardened spring steel face 100 is suitably secured to the lock cam 96 as by having the upper end thereof 102 hooked around a lip 104 on the upper portion of the lock cam 96 and, having the lower end thereof 105 fixed to the cam handle 98, as by means of the screw 106.

In order to lock the fence bar 20 on the work table 10, the fence lock cam handle 98 is pivoted downwardly, which brings the cam face 108 into engagement with the front face 94 of the longitudinal rod 86 and cams the rod rearwardly of the fence bar 20. The longitudinal rod 86 in turn forces the set screw 80 rearwardly, which action pivots the fence lock arm 68 about the pin 70 and brings the lock arm vertical face 74 into an abutting position with the rear face 76 of the rear fence slide bar 34. Continued downward movement of the cam handle 98 to its extreme travel point securely urges the vertical edge 64 of the fence slide 62 against the front vertical face 16 of the work table 10, whereby the fence bar 20 is securely held in place. In order to unlock and release the fence bar 20 for longitudinal movement over the work table 10, the cam handle 98 is moved upwardly until the flat cam face 108 of the cam 96 engages the front end 94 of the longitudinal rod 86, and this is best seen in Fig. 6. During the unlocking movement of the cam handle 98, the fence lock arm 68 is pivoted away from the rear fence slide bar surface 76 by means of a lock arm spring 110, which is suitably secured to the rear undersection of the fence bar 20 as by means of the screw 46 and, which abuts the fence lock arm at the portion indicated as 112.

As was previously stated, the front end of the fence bar 20 is supported by a front fence end member or slide 62 and attention is now directed to the means for connecting the fence bar 20 and slide 62 together. As is best seen in Figs. 3 through 5, the fence slide 62 is provided with a horizontal surface 114 on the front upper surface thereof, on which is carried an elongated fence adjusting shoe 116. The upper surface of the fence shoe 116 is provided on the upper face thereof, with a pair of transversely spaced, longitudinally extending spherical surfaced portions 118 and 120 which are adapted to engage a pair of transversely spaced longitudinal angular surfaces 122 and 124 disposed on the front undersurface of the fence bar 20. The angular surfaces 122 and 124 slant upwardly and inwardly into a recess 125 in the front undersurface of the fence bar 20. The forward end of the fence shoe 116 is provided with an oversized aperture therethrough as at 126 adapted to align with a threaded aperture 128 in the upper surface of the fence slide 62 and with an oversized aperture 130 in the front undersection of the fence bar 20. The oversized aperture 130 in the fence bar 20 extends upwardly and communicates with the slot 92 in the upper front portion of the fence bar 20 and the upper portion thereof is enlarged as at 132. The aperture 130 is provided with a seat portion 134 adapted to operatively receive a spherical washer 136. A screw 138 is adapted to be carried by the spherical washer 136 and to project downwardly through the aperture 130 and through the aperture 126 in the fence shoe 116, and threadably engage the aperture 128 in the fence slide 62. The rear end of the fence shoe 116 is provided with an oversized aperture 140, similar to the aperture 126 in the forward end thereof and which is aligned with a threaded aperture 142 in the lower front part of the fence bar 20 and with an oversized aperture 144 in the upper surface of the fence slide 62. The aperture 144 is provided with a seat 146 adapted to receive a spherical washer 148, similar to the washer 136. A screw 150 is adapted to be mounted in the washer 148 and to pass through the apertures 140 and 144 and threadably engage the aperture 142 in the fence bar 20. It will be understood that by suitably operating the screws 138 and 150, the fence shoe 116 may be adjusted horizontally to provide horizontal adjustment of the fence bar 20 relative to the fence slide 62 in directions parallel to or transverse to its length. It will also be seen that the fence bar 20 may be angularly adjusted with respect to the vertical relative to the fence slide 62 by means of the slanting surfaces 122 and 124, on the fence bar 20, being adjusted relative to the spherical surfaces 118 and 120 on the fence shoe 116.

As is best seen in Figs. 1, 2, and 3, the fence slide 62 is inverted L-shaped in cross section with the horizontal portion 152 thereof overlying the front fence slide bar 52. The upper horizontal slide portion 152 is provided with a pair of apertures, as 154 and 156, disposed on opposite sides of the fence bar 20 and positioned over a flat tape-type scale 158 mounted on the front fence slide bar 52. As is best seen in Fig. 2, the tape scale 158, of plastic or metal, is provided with a double set of graduations, the upper set adapted to read with the work guide fence when it is positioned on the left side of the saw blade 12, and the lower set being adapted to read with the work guide fence when it is positioned on the right side of the saw blade 12.

Suitably mounted on the horizontal slide portion 152, as by screws 160 and 162, is a pair of indicators 164 and 166 adapted to extend over the apertures 154 and 156, respectively. These indicators are so designed that only the correct set of graduations can be read. For example, when the fence bar 20 is disposed on the right side of the saw blade 12, as shown in Fig. 2, the indicator 164 will permit the lower set of graduations to be read, while the indicator 166 blocks out the lower set of graduations. The reverse is true when the fence bar 20 is positioned on the left side of the saw blade 12. As is best seen in Figs. 3 and 6, the upper surface of the front fence slide bar 52 is provided with a sort of dovetail groove 168 which is formed in the bar when it is extruded and into which the flat tape scale 158 is slid, from the end of the bar. This feature of the invention eliminates warpage in the slide bar 52 which would occur if the graduations were rolled into it.

As is best seen in Figs. 3, 4, and 6, the fence slide 62 is provided with a lower portion 170 suitably secured thereto, as by means of screws 172. The lower fence slide portion 170 extends inwardly, under the front fence slide bar 52, and is provided with a vertically disposed boss 174. The vertically disposed boss 174 is provided with an aperture 176 therethrough, in which is slidably mounted a vertical shaft 178 having a pinion 180 suitably fixed on the upper end thereof, and a vernier knob 182 suitably fixed on the lower end thereof, as by means of the screw 184. Fixedly secured to the underside of the front fence slide bar 52, as by means of the screws 186 extending through oversized holes to permit shifting adjustment, is an elongated flat plate 188 provided with a gear rack 190 (Fig. 1) along the front edge thereof adapted to be engaged by the pinion 180. A micro-adjustment of the fence bar 20 relative to the work table 10 may be accomplished by pushing upwardly on the vernier knob 182 so as to engage the pinion 180 with the gear rack 190, and then turning the knob accordingly. During such action, the knob 182 moves up to a position as indicated by the dotted position 191 (Fig. 3), and the pinion 180 moves up to a position as indicated by 193.

The fence bar 20 is prevented from jumping upwardly as it is moved longitudinally of the work table 10 by means of a spring biased finger 192 disposed beneath the elongated flat plate 188 and adapted to maintain a sliding engagement therewith at all times. As is best seen in Figs. 3 and 6, the finger 192 is provided on the forward end thereof with an upwardly extending button 194 adapted to engage the plate 188. The rear end of the finger 192 is provided with pivot pins as 195 which are pivotally mounted on the fence slide 62, as at 196 (Fig. 4). A release lever 198 is integrally connected to the finger 192 by means of the arm 199 and extends outwardly of the fence slide 62 through the aperture 200. The finger 192 is biased upwardly by a suitable spring means, as by spring 202, which is disposed around shaft 178 and abuts the lower side of finger 192.

In use, the rear fence slide bar 34 is fastened to the rear vertical edge 18 of the work table 10 by means of suitable machine screws as 36. The front fence slide bar 52 is then secured to the front vertical edge 16 of the work table 10 by means of suitable machine screws as 54. In assembling the front fence slide bar 52, the screws 54 should be tightened only lightly at first to hold the bar in position while it is being aligned. The front fence slide bar 52 should be aligned very carefully so that it is as nearly parallel to the table top 18 as possible. Such alignment may be accomplished by the use of a combination square to set the bar 52 to the desired depth from the table top 18. After the desired depth has been set, the screws 54 may be securely tightened and, it is advisable to recheck the depth of the bar 52 at several points after all of the screws have been securely tightened.

After the front and rear fence slide bars have been properly installed on the work table 10, the fence bar 20 with its connected fence slide 62 is set on the top of the table in the following manner: With the fingers of one hand under the front end of the fence, a fence release lever 198 is fully depressed with the heel of said hand. The rear end of the fence is then grasped with the other hand and then holding the rear end of the fence bar approximately 10 inches higher than the front end, the fence is positioned on the front slide bar 52. The rear end of the fence is then lowered into position with the roller 40 contacting the upper surface 38 of the rear fence slide bar 34.

The fence bar 20 should lock parallel to the miter slots 14 in the work table 10 and should be square with the table surface 13. The following procedure should be followed when adjusting the fence bar 20 to such relationship. A set of blocks of wood or steel, as 204 and 206 (Fig. 1), are fitted in the miter slot 14 at opposite ends of the table 10. The two adjusting screws 138 and 150 are then loosened and the fence is placed in a position against the blocks 204 and 206. Then, while holding the fence bar 20 tight against the blocks 204 and 206, which action checks parallelism to the miter slot 14, the fence bar 20 is adjusted square to the table surface 13 by the use of a combination square resting on the table and abutting the side of the fence. When the fence has been properly adjusted, the top adjusting screw 138 is first securely tightened and the fence is then removed from the table and turned over so that the bottom adjusting screw 150 may be securely tightened.

The clearance between the bottom of the fence bar 20 and the top table surface 13 should be held uniform along the entire length of the fence. The clearance at the front of the table 10 is established when the front fence bar 52 is set to a certain selected dimension and the clearance at the rear of the table is established when the rear fence bar 34 is set to the same dimension or by means of adjusting the rear fence roller 40 upwardly or downwardly relative to the fence bar 20 by means of the adjusting screw 50.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

Certain features of this invention are also shown in my co-pending application Serial No. 260,697, filed December 8, 1951, which issued into Patent No. 2,677,400.

What is claimed is:

1. In a machine tool provided with a work table, the combination of, a work guide fence bar, a resiliently mounted roller means on the rear end of said fence bar tending to raise the bar above the table, a fence slide connected to the front end of said fence bar, means on said table providing a horizontal track to operatively engage and support said roller means, a front fence slide bar on said work table adapted to operatively engage and support said fence slide, whereby said fence bar may be moved longitudinally of said table, and clamping means on said fence bar adapted to operatively engage said table to securely hold said fence bar in place.

2. In a machine tool provided with a work table, the combination of, a work guide fence bar, a roller adjustably mounted on the rear end of said fence bar and rolling about an axis substantially parallel to the length of the bar, means on the table providing a horizontal track for the roller means, a fence slide connected to the front end of said fence bar, a front fence slide bar on said work table adapted to operatively engage and support said fence slide, a resiliently biased finger on said fence slide adapted to operatively engage said front fence slide bar to hold the fence slide firmly against the front fence slide bar, a gear rack on said front fence slide bar, a vertically movable pinion on said fence slide adapted to operatively engage said gear rack, whereby said fence bar may be moved longitudinally of said table, said pinion being disengaged by gravity from said rack, and clamping means on said fence bar adapted to operatively engage said table to securely hold said fence bar in place.

3. In a machine tool provided with a work table, the combination of, a work guide fence bar, a flexible member having one end connected to the rear end of said fence bar, a roller on the other end of said flexible member, and means on said fence bar operatively engaging said flexible member intermediate the ends thereof and adapted to adjust said member and roller relative to said fence bar, a fence slide connected to the front end of said fence bar, means disposed intermediate the lower surface of the front end of said fence bar and said fence slide and providing for horizontal and angular adjustment of said fence bar relative to said fence slide, said roller and said fence slide being adapted to operatively engage said work table for movement longitudinally thereof.

4. In a machine tool provided with a work table, the combination of, a work guide fence bar, the lower front surface of said fence bar being provided with a recess having a pair of transversely spaced, longitudinally and inwardly upwardly extending slanting surfaces, a fence shoe having a pair of transversely spaced longitudinally extending spherical surfaces on the upper side thereof, said shoe spherical surfaces being adapted to operatively engage said fence bar slanting surfaces and support said fence bar, a fence slide adapted to carry said fence shoe, a first spherical washer carried by said fence bar, a first screw adapted to pass through said first spherical washer and through an aperture in said fence shoe and threadably engage said fence slide, a second spherical washer carried by said fence slide, a second screw adapted to pass through said second spherical washer and through an aperture in said fence shoe and to threadably engage said fence bar, said washer, screws and fence shoe providing for horizontal and angular adjustment of said fence bar relative to said fence slide, said fence slide being adapted to operatively engage said work table for movement longitudinally thereof, and clamping means on said fence bar adapted to operatively engage said table to securely hold said fence bar in place.

5. In a machine tool provided with a work table, the combination of, a work guide fence bar, a flexible member having one end connected to the rear end of said fence bar, a roller on the other end of said flexible member, and means on said fence bar operatively engaging said flexible member intermediate the ends thereof and adapted to adjust said member and roller relative to said fence bar, the lower front surface of said fence bar being provided with a recess having a pair of transversely spaced, longitudinally and inwardly upwardly extending slanting surfaces, a fence shoe having a pair of transversely spaced longitudinally extending spherical surfaces on the upper side thereof, said shoe spherical surfaces being adapted to operatively engage said fence bar slanting surfaces and support said fence bar, a fence slide adapted to carry said fence shoe, a first spherical washer carried by said fence bar, a first screw adapted to pass through said first spherical washer and through an aperture in said fence shoe and threadably engage said fence slide, a second spherical washer carried by said fence slide, a second screw adapted to pass through said second spherical washer and through an aperture in said fence shoe and to threadably engage said fence bar, said washer, screws and fence shoe providing for horizontal and angular adjustment of said fence bar relative to said fence slide, a rear fence slide bar on said table adapted to operatively engage and support said roller, a front fence slide bar on said work table adapted to operatively engage and support said fence slide, whereby said fence bar may be moved longitudinally of said table, and clamping means on said fence bar adapted to operatively engage the table to securely hold said fence bar in place.

6. In a machine tool provided with a work table, the combination of, a work guide fence bar, a flexible member having one end connected to the rear end of said fence bar, a roller on the other end of said flexible member, and means on said fence bar operatively engaging said flexible member intermediate the ends thereof and adapted to adjust said member and roller relative to said fence bar, the lower front surface of said fence bar being provided with a recess having a pair of transversely spaced, longitudinally and inwardly upwardly extending slanting surfaces, a fence shoe having a pair of transversely spaced longitudinally extending spherical surfaces on the upper side thereof, said shoe spherical surfaces being adapted to operatively engage said fence bar slanting surfaces and support said fence bar, a fence slide adapted to carry said fence shoe, a first spherical washer carried by said fence bar, a first screw adapted to pass through said spherical washer and through an aperture in said fence shoe and threadably engage said fence slide, a second spherical washer carried by said fence slide, a second screw adapted to pass through said second spherical washer and through an aperture in said fence shoe and to threadably engage said fence bar, said washer, screws and fence shoe providing for horizontal and angular adjustment of said fence bar relative to said fence slide, a rear fence slide bar on said table adapted to operatively engage and support said roller, a front fence slide bar on said work table adapted to operatively engage and support said fence slide, a longitudinally extending flat plate on the underside of said front fence slide bar, a gear rack formed on the outer edge of said plate, a vertical shaft slidably mounted in said fence slide, a pinion on the upper end of said shaft, a knob on the lower end of said shaft whereby said shaft and pinion may be moved upwardly to operatively engage said gear rack to move said fence bar longitudinally of said table, and clamping means on said fence bar adapted to operatively engage said table to securely hold said fence bar in place.

7. In a machine tool provided with a work table, the combination of, a work guide fence bar, a flexible member having one end connected to the rear end of said fence bar, a roller on the other end of said flexible member, and means on said fence bar operatively engaging said flexible member intermediate the ends thereof and adapted to adjust said member and roller relative to said fence bar, the lower front surface of said fence bar being provided with a recess having a pair of transversely spaced longitudinally and inwardly upwardly extending slanting surfaces, a fence shoe having a pair of transversely spaced longitudinally extending spherical surfaces on the upper side thereof, said shoe spherical surfaces being adapted to operatively engage said fence bar slanting surfaces and support said fence bar, a fence slide adapted to carry said fence shoe, a first spherical washer carried by said fence bar, a first screw adapted to pass through said spherical washer and through an aperture in said fence shoe and threadably engage said fence slide, a second spherical washer carried by said fence slide, a second screw adapted to pass through said second spherical washer and through an aperture in said fence shoe and to threadably engage said fence bar, said washer, screws and fence shoe providing for horizontal and angular adjustment of said fence bar relative to said fence slide, a rear fence slide bar on said table adapted to operatively engage and support said roller, a front fence slide bar on said work table adapted to operatively engage and support said fence slide, a longitudinally extending flat plate on the underside of said front fence slide bar, a gear rack formed on the outer edge of said plate, a vertical shaft slidably mounted in said fence slide, a pinion on the upper end of said shaft, a knob on the lower end of said shaft whereby said shaft and pinion may be moved upwardly to operatively engage said gear rack to move said fence bar longitudinally of said table, a finger having one end pivotally mounted on said fence slide, the other end of said finger extending under said flat plate and being provided with a button adapted to slidably engage said flat plate, a resilient biasing means on said fence slide adapted to bias said finger into a slidable engagement with said plate, a release lever connected to the pivotally mounted end of said finger, whereby when said lever is actuated, said button will be disengaged from said plate, and clamping means on said fence bar adapted to operatively engage said table to securely hold said fence bar in place.

8. In a machine tool provided with a work table, the combination of, a work guide fence bar, a flexible member having one end connected to the rear end of said fence bar, a roller on the other end of said flexible member, and means on said fence bar operatively engaging said flexible member intermediate the ends thereof and adapted to adjust said member and roller relative to said fence bar, the lower front surface of said fence bar being provided with a recess having a pair of transversely spaced, longitudinally and inwardly upwardly extending slanting surfaces, a fence shoe having a pair of transversely spaced longitudinally extending spherical surfaces on the upper side thereof, said shoe spherical surfaces being adapted to operatively engage said fence bar slanting surfaces and support said fence bar, a fence slide adapted to carry said fence shoe, a first spherical washer carried by said fence bar, a first screw adapted to pass through said spherical washer and through an aperture in said fence shoe and threadably engage said fence slide, a second spherical washer carried by said fence slide, a second screw adapted to pass through said second spherical washer and through an aperture in said fence shoe and to threadably engage said fence bar, said washer, screws and fence shoe being adapted to permit said fence bar to be horizontally and angularly adjusted relative to said fence slide, a rear fence slide bar on said table adapted to operatively engage and support said roller, a front fence slide bar on said work table adapted to operatively engage and support said fence slide, a longitudinally extending flat plate on the underside of said front fence slide bar, a gear rack formed on the outer edge of said plate, a vertical shaft slidably mounted on said fence slide, a pinion on the upper end of said shaft, a knob on the lower end of said shaft whereby said shaft and pinion may be moved upwardly to operatively engage said gear rack to move said fence bar longitudinally of said table, a finger having one end pivotally mounted on said fence slide, the other end of said finger extending under said flat plate and being provided with a button adapted to slidably engage said flat plate, a resilient biasing means on said fence slide adapted to bias said finger into a slidable engagement with said plate, a release lever connected to the pivotally mounted end of said finger, whereby when said lever is actuated, said button will be disengaged from said plate, a graduated scale on said front fence slide bar, indicator means on said fence slide disposed in apertures overlying said scale, and clamping means on said fence bar adapted to operatively engage said table to securely hold said fence ber in place.

9. In a machine tool provided with a work table, the combination of, a work guide fence bar, a flexible member having one end connected to the rear end of said fence bar, a roller on the other end of said flexible member, and means on said fence bar operatively engaging said flexible member intermediate the ends thereof and adapted to adjust said member and roller relative to said fence bar, the lower front surface of said fence bar being provided with a recess having a pair of transversely spaced, longitudinally and inwardly upwardly extending slanting surfaces, a fence shoe having a pair of transversely spaced longitudinally extending spherical surfaces on the upper side thereof, said shoe spherical surfaces being adapted to operatively engage said fence bar slanting surfaces and support said fence bar, a fence slide adapted to carry said fence shoe, a first spherical washer carried by said fence bar, a first screw adapted to pass through said spherical washer and through an aperture in said fence shoe and threadably engage said fence slide, a second spherical washer carried by said fence slide, a second screw adapted to pass through said second spherical washer and through an aperture in said fence shoe and to threadably engage said fence bar, said washer, screws and fence shoe being adapted to permit said fence bar to be horizontally and angularly adjusted relative to said fence slide, a rear fence slide bar on said table adapted to operatively engage and support said roller, a front fence slide bar on said work table adapted to operatively engage and support said fence slide, a longitudinally extending flat plate on the underside of said front fence slide bar, a gear rack formed on the outer edge of said plate, a vertical shaft slidably mounted on said fence slide, a pinion on the upper end of said shaft, a knob on the lower end of said shaft whereby said shaft and pinion may be moved upwardly to operatively engage said gear rack to move said fence bar longitudinally of said table, a finger having one end pivotally mounted on said fence slide, the other end of said finger extending under said flat plate and being provided with a button adapted to slidably engage said flat plate, a resilient biasing means on said fence slide adapted to bias said finger into a slidable engagement with said plate, a release lever connected to the pivotally mounted end of said finger, whereby when said lever is actuated, said button will be disengaged from said plate, a graduated scale on said front fence slide bar, indicator means on said fence slide disposed in apertures overlying said scale, an arm pivotally mounted on the rear end of said fence bar, an inwardly extending portion on the lower part of said arm adapted to abut said rear fence slide bar, an elongated rod slidably mounted in the fence bar and adapted to abut the upper end of said arm, a lock cam pivotally mounted on the front end of said fence bar, said cam having a hardened steel cover thereon adapted to operatively engage the front end of said elongated rod, and a handle on said cam whereby said cam may be pivoted to move said rod rearwardly of said fence bar to pivot said arm into a locking engagement with said rear fence slide bar to clamp the fence bar on said table.

10. In a machine tool provided with a work table, a slidably supported fence bar and a fence slide, means disposed intermediate the lower surface of the front end of said fence bar and the upper surface of said fence slide comprising, an elongated member having on one side horizontal surface adapted to operatively engage one of said upper and lower surfaces, said member being provided on the other side with a pair of transversely spaced longitudinally extending spherical surfaces adapted to operatively engage a pair of transversely spaced inwardly and upwardly slanting longitudinal surfaces on the other of said upper and lower surfaces, whereby said fence bar may be horizontally and angularly adjusted relative to said fence slide, and fastening means adapted to releasably hold said fence slide bar and fence slide together.

11. In a machine tool provided with a work table which slidably supports a work fence slide, means on the front of said work table adapted to slidably support said fence slide comprising, a longitudinally extending hollow bar, said bar being adjustably secured to a front vertical edge on said table, an inwardly slanting, longitudinally extending surface forming a way on said bar adapted to slidably receive said fence slide, a longitudinally extending groove on the upper side of said bar, a tape-type scale slidably mounted in said groove, a longitudinally extending plate on the lower side of said bar, a gear rack formed on the front edge of said plate, a vertical shaft slidably mounted on said fence slide, a knob on the lower end of said shaft, a pinion on the upper end of said shaft, whereby said knob may be moved upwardly to engage said pinion with said rack to move said fence slide longitudinally of the table.

12. The invention as set forth in claim 11, wherein said scale is provided with an inner and outer set of numbers and said fence slide is provided with a pair of indicators disposed so that only one particular set of numbers can be read with each indicator.

13. The invention as set forth in claim 11, wherein said fence slide is provided with a pivotally mounted resiliently biased finger adapted to operatively engage the lower side of said bar to maintain continuous contact between said way and the fence slide.

14. In a fence bar construction for woodworking saw tables or the like, including a table plate, a fence slide bar secured to the front of said table plate, a groove in the top of said slide bar, a tape type insert in said groove containing two sets of indicia running in opposite directions, one set being located on one transverse side of the tape and the other being located on the opposite transverse side and both being visible from above the slide bar, a fence bar including a slide construction slidably mounted on said slide bar, said fence slide including a pointer on one side of the bar cooperative with but one of said sets of indicia, said fence slide including a pointer on the other side of the bar cooperative with only the other of said sets of indicia.

15. In a work fence construction for a table saw or the like including a table, means providing a slide surface on the front of the table, a fence bar including a slide portion slidably mounted on said slide surface, means providing a rack having vertically disposed rack teeth running along the front vertical face of the table, said slide including a portion extending beneath said rack teeth, a pinion mounted in said slide portion for vertical movement into and out of engagement with said teeth, in disengaged position said pinion being located below said rack teeth, and a knob operatively secured to said pinion and providing means to manually rotate it and to move it upwardly into contact with said rack teeth, said pinion and knob being movable by the force of gravity out of engagement with said rack teeth.

16. In a fence construction for a saw table or the like, a table plate including a fence bar slide supporting surface, a fence bar having a slide supported on said supporting surface, said slide and supporting surface being arranged so that the fence bar is removable from the slide bar by lifting it from the slide in an upward and outward direction, releasable means for engaging a bottom surface of said table plate to resist lifting of the fence bar from said slide surface, said releasable means including a lever pivoted outwardly of the table and having a portion extending underneath and adapted to slidably engage a bottom surface of said table, said lever including an operating portion projecting through an aperture in the front of the slide, and means urging the lever into light engagement with said bottom surface.

17. In a fence bar construction for a table saw or the like, an elongated fence bar including an operating rod slidably mounted therein, an operating lever pivoted at one end of the fence bar and having a cam surface engageable with an end of said operating rod whereby pivotal movement of said handle causes longitudinal movement of the rod, a hardened spring steel wear strip on said cam surface including a hook at one end fitting in a notch on the cam surface, the other end of said strip being reversely bent and having the shape of said cam surface and including a flange portion, and a screw threaded through said flange portion into the operating handle to hold along with said hook end the strip in contact with the cam surface.

18. The invention set forth in claim 1 wherein said roller means comprises a cantilever spring element projecting longitudinally from said bar and rotatably carrying a roller, the axis of rotation of the roller being parallel to the length of the bar.

19. The invention set forth in claim 18 wherein said cantilever spring element is L-shaped and one leg thereof is connected longitudinally to the bottom of said bar, said one leg having a first upwardly offset portion in contact with the bottom of the bar and a second portion spaced slightly from the bottom of the bar, said roller axis being parallel to said longitudinal leg, both portions being attached by threaded means to the bottom of said bar whereby the vertical spacing of said roller axis may be adjusted relative to the bar.

20. The invention set forth in claim 1 including a movable clamp member mounted on the rear end of the bar to clamp against the table and an L-shaped cantilever spring element having one end longitudinally secured to the bottom of the bar and the other pressing on said clamp member to urge it toward non-clamping position.

21. The invention set forth in claim 1 including a clamp member mounted on the rear end of the bar to clamp against the table, a pair of overlapped L-shaped cantilever spring elements each having one leg secured longitudinally to the bottom of the bar, the other ends of said elements projecting away from the bar, one of said other legs engaging said clamp member to urge it away from clamping position, the other of said other legs carrying a roller having its axis parallel to said longitudinal leg and providing said resiliently mounted roller means.

References Cited in the file of this patent

UNITED STATES PATENTS

| | | |
|---|---|---|
| 1,826,222 | Peterson | Oct. 6, 1931 |
| 2,166,703 | Boice | July 18, 1939 |
| 2,183,190 | Haas | Dec. 12, 1939 |
| 2,273,715 | Lonskey et al. | Feb. 17, 1942 |
| 2,274,129 | Collins | Feb. 24, 1942 |
| 2,325,082 | Tautz | July 27, 1943 |
| 2,374,286 | Hargadon | Apr. 24, 1945 |
| 2,498,865 | Snow | Feb. 28, 1950 |
| 2,521,302 | Musselman | Sept. 5, 1950 |
| 2,556,548 | Modderman | June 12, 1951 |
| 2,562,246 | Van Dam et al. | July 31, 1951 |
| 2,579,224 | Boice | Dec. 18, 1951 |
| 2,585,957 | Meeker et al. | Feb. 19, 1952 |
| 2,619,173 | Crain | Nov. 25, 1952 |
| 2,630,845 | Eschenburg | Mar. 10, 1953 |
| 2,667,190 | Delano | Jan. 26, 1954 |
| 2,677,400 | Gaskell | Mar. 4, 1954 |